United States Patent

[15] 3,662,550

Lichtfuss

[45] May 16, 1972

[54] ACTUATOR SYSTEM

[72] Inventor: Gerhardt E. Lichtfuss, Rockford, Ill.
[73] Assignee: Sundstrand Corporation
[22] Filed: Jan. 11, 1971
[21] Appl. No.: 105,272

[52] U.S. Cl. ..........................60/53 R, 91/363 A, 91/411 R
[51] Int. Cl. .......................................................F16d 33/00
[58] Field of Search..........................60/53 R, 97 E, 53 WW;
91/363 A, 380, 381, 411 R, 413, 41, 44

[56] References Cited

UNITED STATES PATENTS

| | | | |
|---|---|---|---|
| 2,416,801 | 3/1947 | Robinson | 60/53 WW |
| 2,597,420 | 5/1952 | Westbury | 91/380 X |
| 3,296,936 | 1/1967 | Wess et al. | 91/380 X |
| 3,401,600 | 9/1968 | Wood | 91/44 |
| 3,433,125 | 3/1969 | Gemmell | 91/411 R |
| 3,554,084 | 1/1971 | Rasmussen et al. | 91/411 R |

Primary Examiner—Edgar W. Geoghegan
Attorney—Hofgren, Wegner, Allen, Stellman & McCord

[57] ABSTRACT

An actuator system for air foil surfaces such as leading edge slats in an aircraft wing, including a drive shaft for actuating the slats, a pair of hydraulic motors for driving the shaft, separate control circuits for the motors supplied from separate sources of pressure fluid, manually operable valve means for simultaneously energizing both control systems to operate both motors to drive the shaft, free wheeling valve means in each circuit enabling either motor to be driven by the shaft in event of pressure failure in its circuit, brake means for the drive shaft, separate brake release devices controlled separately by the two circuits such that either is capable of releasing the brake when the shaft is put in operation, and feedback means driven by the shaft for neutralizing the manual valve means and stopping the drive motors when the required slat adjustment is completed.

17 Claims, 2 Drawing Figures

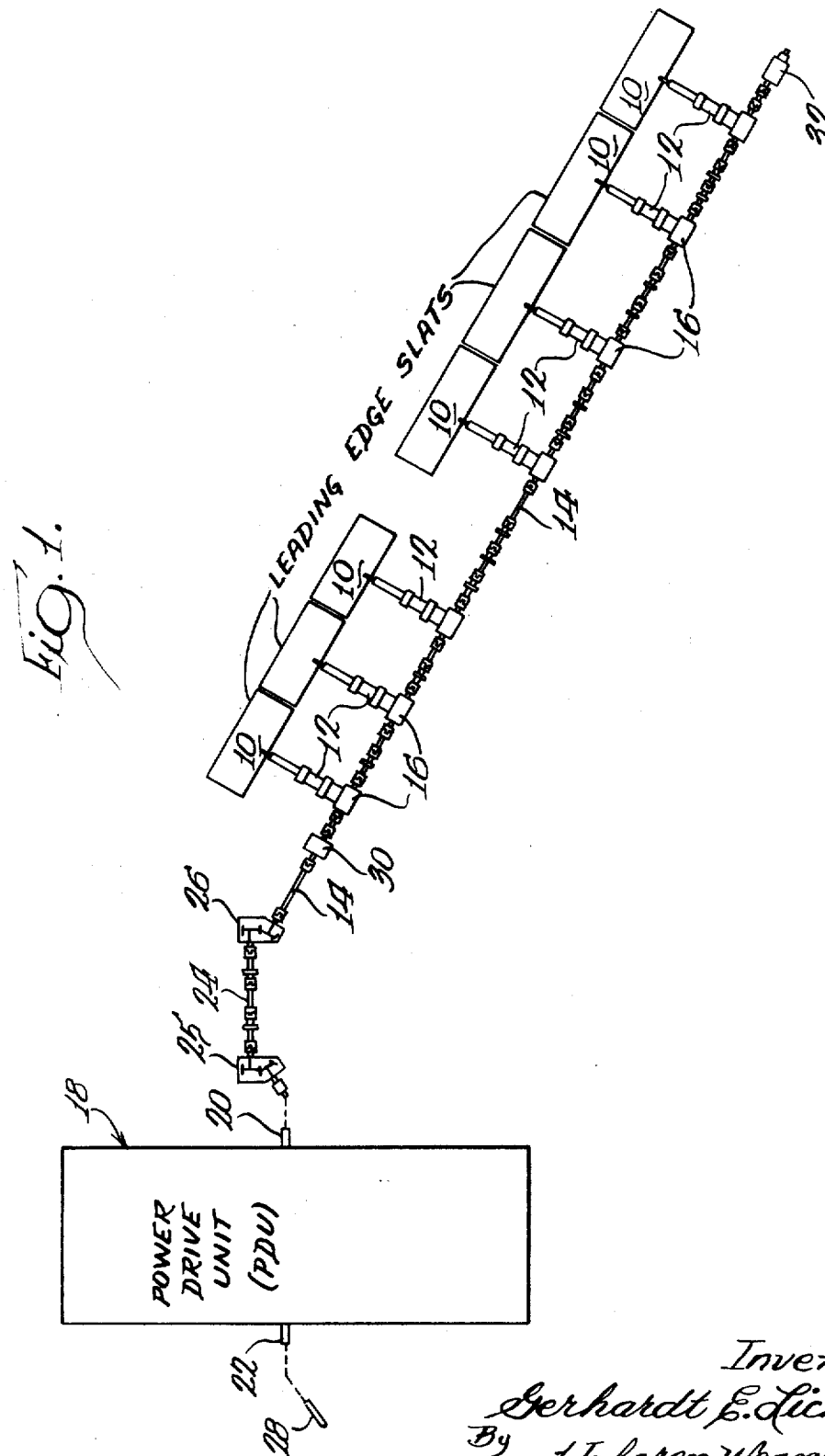

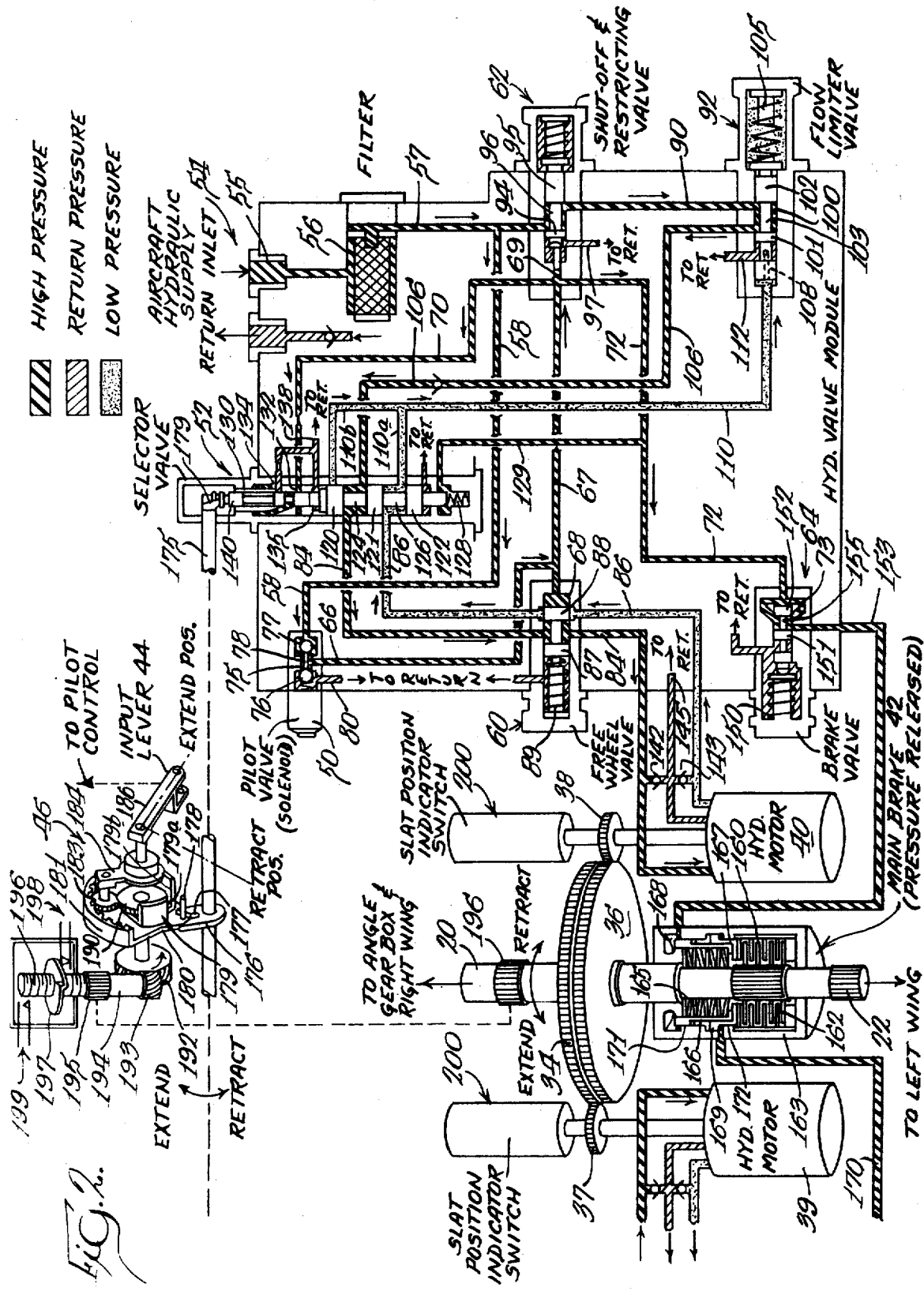

ACTUATOR SYSTEM

BACKGROUND OF THE INVENTION

In the past, provision has been made for actuation of air foil surfaces such as leading edge slats and trailing edge flaps in aircraft wings. As in many endeavors, even the most sophisticated actuator systems are subject to limitations, and because of the critical importance of such systems to the preservation of life and expensive aircraft equipment, efforts are continuously exerted to improve the systems, particularly for use in connection with new aircraft. The present invention was developed in such an atmosphere with a view toward providing a very high degree of certainty of operation through dual operating means for each of a plurality of functions which insure functioning by a one means even if another means fails.

SUMMARY OF THE INVENTION

In a preferred embodiment of the invention, an actuator system is provided for reciprocating leading edge slats in the wings of an aircraft. The slats are actuated by a drive shaft adapted to be driven by a pair of hydraulic motors acting together, or by either one of the motors acting singly, in event of failure of the other. The motors are supplied with fluid under pressure through separate control circuits supplied from separate sources of fluid under pressure available on the aircraft. The control circuits are adapted to be simultaneously energized by common input signals under selective control of the aircraft pilot or engineer. Each circuit includes a free wheeling valve operable in event of pressure failure to connect the motor outlet to the motor inlet so the motor may be freely driven by the drive shaft, thus permitting system operation without imposing additional load. In event of adequate pressure in each system the free wheeling valve is disabled responsive to pressure buildup.

In order to maintain the actuator system and slats stationary in the positions desired, extended or retracted, a brake acts to normally hold the drive shaft stationary. The brake is released responsive to pressure in the control circuit so that the drive shaft is free to rotate. The brake is a disc type in which the discs are frictionally engaged by force of Belleville springs. The Belleville springs are carried in nested cups each formed with a flanged portion functioning as a piston subjected to pressure fluid for brake release. The pressure release devices normally function together, but in event of failure of pressure in either hydraulic control system, either release device is capable of releasing the brake.

After selective energization of the control system by appropriate valve operation, the drive shaft actuates a feedback mechanism including means for neutralizing the valve means to stop the system with the slats positioned as desired. In order to initiate system operation, mechanical operation of one valve is required and electrical operation of another valve is required. The feedback mechanism functions to neutralize both valves, but return of either valve will serve to stop the actuation.

BRIEF DESCRIPTION OF THE DRAWINGS

FIG. 1 is a diagrammatic illustration of an actuator system embodying the present invention including a showing of the disposition of leading edge slats along one wing of an aircraft;

FIG. 2 is a diagrammatic illustration of the power drive unit for the actuator system including drive shaft, drive motors, brake, hydraulic system and feedback.

DETAILED DESCRIPTION OF PREFERRED EMBODIMENT

Referring now to FIG. 1 for a more detailed description of a system embodying the present invention, leading edge slats 10 are disposed along the front edge of a wing structure (the right wing is illustrated) of an aircraft and appropriately mounted for reciprocable motion to be extended and retracted relative to the main body of the wing by individual actuators such as rotary screw devices 12. As shown, there are seven such slats 10 and seven actuators 12. The screw devices 12 are all driven from a common source including a drive shaft 14 constructed of a plurality of sections connected by universal joints so as to be flexible in a way to permit flexing the wing structure while still transmitting rotary power to drive the screw devices 12, each of which is connected with the drive shaft through individual gear boxes as at 16.

Power for driving the shaft 14 is derived from a power drive unit (PDU) 18 which includes a double ended drive shaft including a right end portion 20 for actuating the slats 10 in the right wing and a left end portion 22 for actuating the slats in the left wing. In the preferred system illustrated, the power drive unit 18 is located at the left side of the fuselage and the drive shaft portion 20 is connected with the flexible shaft 14 through flexible shaft 24 and angle gear boxes 25 and 26. The left shaft portion 22 is connected to drive a shaft 28 corresponding to shaft 14 in the right wing. Preferably, the shaft 14 includes a torque limiting brake 30 responsive to the load imposed on the shaft 14 and operable in event of an overload to apply a brake to the shaft to stall the hydraulic drive applied to shaft 20, 22. As illustrated, the system includes an asymmetry brake 32 adapted to be applied at the end of shaft 14 in response to some predetermined maximum permissible asymmetry between the actuator system in the right wing and the actuator system in the left wing.

Referring now to FIG. 2 for a more detailed description of the power drive unit 18, the drive shaft with end portions 20 and 22 includes a pair of large drive gears 34 and 36 fixed thereon for purposes of driving the shaft and respectively in mesh with smaller reduction drive gears 37 and 38. The gears 37 and 38 are respectively fixed on the drive shafts from hydraulic motors 39 and 40. The hydraulic motors are controlled by separate similar control systems supplied respectively from two separate sources of hydraulic fluid under pressure, and the motors are adapted to both apply torque for rotating the drive shaft, normally working together, but each has a capacity to rotate the drive shaft alone in event of failure in the other system. There is thus a safety feature in the capacity of either system to adequately rotate the drive shaft.

When not in operation, the drive shaft is adapted to be held by a single brake mechanism 42 which is subject to control by either or both of the hydraulic systems so that operation of either system releases the drive shaft for rotation. There is a single manual mechanical pilot input lever 44 for simultaneously actuating valving in both hydraulic systems to set the drive shaft 20 in motion for actuating the slats. Associated with the input in the drive shaft, there is a single feedback mechanism 46 adapted to neutralize both hydraulic systems when appropriate slat adjustment has occurred. It should be understood that the actuator system controlled by the shaft 28 in FIG. 1 is similar to the actuator system controlled by the shaft 14, so that it is unnecessary to show the entire left wing structure. Similarly, in connection with FIG. 2, it should be understood that the control system associated with hydraulic motor 39 is similar to that associated with the hydraulic motor 40 and need not be repetitively shown.

To put the actuator system in operation, there must be both an electrical signal at a pilot solenoid valve 50 and a mechanical signal at a selector valve 52 which have the effect of starting and stopping flow relative to a supply 54 and which have the additional effect of controlling the direction of flow to the reversible hydraulic motor 40. Fluid under pressure is supplied to the pilot valve 50 from a supply inlet 55 through a filter 56 and conduits 57 and 58 leading to the pilot valve 50. The pilot valve controls flow to a free wheeling valve 60, a shutoff and restricting valve 62, a servo control in the selector valve 52, and a brake valve 64. For such purposes, a conduit 66 leads from the pilot valve to a conduit 67 communicating with an actuating chamber 68 in free wheeling valve 60 and an actuating chamber 69 in shutoff valve 62. A conduit 70 leads from conduit 67 to the servo control in selector valve 52, and a conduit 72 leads from conduit 67 to an actuating chamber 73 in brake valve 64.

The pilot solenoid valve 50 includes a valve housing with a bore 75 communicating with conduit 66 and adapted to be controlled at opposite ends by ball valve members 76 and 77 separated by a stem 78. Normally, when the valve solenoid is deenergized, the valve members are yieldably urged toward the right to the position illustrated in FIG. 2 where the ball member 76 blocks communication between the conduit 66 and a drain or return conduit 80, while the ball valve member 77 permits communication between the conduit 58 and the conduit 66. Upon energization of the valve solenoid, the valve members are shifted from the open position illustrated toward the left where ball valve member 77 blocks communication between the supply conduit 58 and the conduit 66, while the latter is communicated with drain conduit 80 through the valve bore 75. In operation, the solenoid is energized to stop the actuator system and is deenergized to start the actuator system. When the valve is opened as shown, fluid under pressure is supplied from the inlet port 55, the filter 56, the conduit 57, the conduit 58, the valve 50, the conduit 66, and the conduit 67 which communicates with the free wheeling valve 60, the shutoff valve 62, the servo in selector valve 52 and the brake valve 64.

The free wheeling valve 60 is constructed with a valve bore intersected by a conduit 84 for supplying fluid to the hydraulic motor 40 to drive the latter in a direction to extend the slats and by a conduit 86 for supplying fluid to the motor 40 to drive the latter in a direction to retract the slats. Communication between the two conduits is controlled by a valve member slidable in the valve bore and including spaced lands 87 and 88 separated by a reduced stem. Normally the valve member is urged toward the right in FIG. 2 by a yieldable spring 89 to a position where the reduced stem portion places the conduits 84 and 86 in communication with each other, so that in the event of pressure failure at the inlet port 55, such that motor 40 is not fluid driven, the motor may be mechanically driven by gears 36 and 38, free wheeling in pumping fashion, while fluid from the motor outlet flows to the free wheeling valve and back to the motor inlet. When the system operates as intended, with fluid under pressure available at the inlet port 55, opening of the pilot valve 50 supplies fluid under pressure through conduits 66 and 67 to chamber 68, forcing the valve member toward the left to the position shown in FIG. 2 where communication between the conduits 80 and 86 is blocked by the valve land 88. Under these circumstances, fluid under pressure flows from the selector valve 52 through the free wheeling valve to the motor 40, and from the motor 40 back through the free wheeling valve to the selector valve.

The shutoff valve 62 controlled by the pilot valve 50 is constructed with a valve bore intersected by supply conduit 57 and a conduit 90 leading to a flow limiter valve 92. In the shutoff valve bore there is a slidable valve member including spaced lands 94 and 95 separated by a reduced stem portion 96. Normally, the valve stem is urged toward the left to a position where valve land 95 blocks communication between conduits 57 and 90, and the conduit 57 communicates with drain or return conduit 97. However, when the pilot valve 50 is opened, as illustrated, and fluid under pressure is available at inlet port 55, fluid pressure is applied through conduit 67 to the chamber 69 to force the valve member toward the right to the position shown where reduced stem portion 96 communicates supply conduit 57 with the conduit 90 leading to flow limiter valve 92.

Flow limiter valve 92 is constructed with a valve bore 100 slidably receiving a valve member with spaced lands 101 and 102 separated by a reduced stem portion 103. Normally, the valve member is urged toward the left to the position illustrated by resilient spring means as at 105, so that the reduced stem portion 103 places the conduit 90 in communication with the conduit 106 leading from the flow limiter valve to supply fluid under pressure to the selector valve 52. The flow limiting function of the valve 92 is performed by provision of a passage of limited capacity in the valve member as at 108 adapted to conduct fluid returning from the motor 40 through conduit 110 from the conduit 110 to a return or drain conduit 112. In the event of an aiding load applied to the motor 40, as where air forces acting on the slats tend to drive the motor as a pump, the supply of fluid under pressure through the conduit 110 acts to shift the valve member toward the right to a place where flow between the conduits 90 and 106 is restricted and flow between the conduits 110 and 112 is restricted.

The selector valve 52 includes a valve bore intersected by the motor conduits 84 and 86, intersected by the supply conduit 106, and intersected by branches 110a and 110b of return conduit 110. The selector valve bore receives a main valve member with three spaced valve lands 120, 121 and 122 separated by reduced stems 124 and 126. In operation, the main valve stem is normally biased upwardly by spring means 128 and fluid from conduit 129 to a position where reduced stem portion 126 communicates the supply conduit 106 with motor conduit 86, and reduced stem portion 124 communicates motor conduit 84 with return conduit 110b. When the main valve member is moved downwardly to the position shown in FIG. 2, reduced stem portion 124 communicates the supply conduit 106 with motor conduit 84 to drive the hydraulic motor 40 in a direction to extend the slats, while the reduced stem portion 126 communicates the motor conduit 86 with return conduit 110a.

The selector valve includes a servo control in the form of a valve sleeve 130 slidable in the main valve bore and adapted to act against the main valve member to move the latter downwardly. Sleeve 130 includes a centrally located pressure supply port 132 adapted to communicate with pressure conduit 70, and return ports 134 and 135 at opposite sides of the pressure port 132. The return ports 134 and 135 communicate with a return or drain passage 138. Inside the sleeve 130 there is a manually operable valve stem 140 movable downwardly to port fluid under pressure from the pressure conduit 70 to the upper end of the sleeve 130 to move the main valve member downwardly to the position shown in FIG. 2. The valve stem 140 is movable upwardly to a position porting the upper end of valve sleeve 130 to the drain conduit 138, whereby the biasing means 128, 129 is effective to move the main valve member upwardly to a position communicating supply conduit 106 with motor conduit 86 to drive the hydraulic motor 40 in a direction to retract the slats 10. The valve stem 140 is adapted to be controlled by a mechanical pilot control described in more detail below.

In order to prevent cavitation of the motor 40, check valves are provided as at 142 and 143 between the motor conduits 84 and 86 and a drain or return conduit 145. If the pressure in the motor inlet port is less than the pressure in the return line 145, one of the check valves opens and the pressure is equalized. This assures positive pressure at the motor inlet port and eliminates the possibility of cavitation.

Brake valve 64 is constructed with a valve bore having a valve member slidable therein and normally urged by spring means 150 toward the right to a position where valve land 151 and valve land 152 prevent communication between pressure conduit 72 and a conduit 153 leading to the brake 42. Upon opening of the pilot valve 50, fluid pressure in the conduit 72 and the chamber 73 forces the valve member toward the left where a reduced stem portion 155 places the conduit 72 in communication with the conduit 153 for purposes of releasing the brake 42 as described in more detail below.

The brake 42 is a disc type including a plurality of disc members as at 160 splined on the drive shaft for rotation therewith and a plurality of alternate brake discs as at 162 splined in a stationary housing 163. The discs 160 and 162 are normally urged into frictional engagement with each other by means of Belleville springs as at 165 sufficiently to hold the drive shaft portions 20 and 22 against rotation. The Belleville springs are housed in a cup shaped brake release member 166 in turn nested within another cup shaped brake release member 167. The arrangement is such that if either of the cup shaped brake release members 166 or 167 is moved upwardly, pressure is relieved from the brake discs and the shaft is free to rotate.

In order to release the brake, the cup-shaped member 166 includes an upper enlarged rim 168 adapted to function as a piston subjected to fluid under pressure through conduit 153. Similarly, the cup-shaped brake release member 167 includes an upper enlarged rim portion 169 adapted to function as a piston subjected to fluid under pressure from a conduit 170 in the left-hand hydraulic system corresponding to pressure conduit 153 in the right-hand system. The brake release pistons 168 and 169 reciprocate in chambers in the brake housing 163, and the release pressures are isolated from each other by double sealing surfaces, so that leakage in one chamber does not result in failure of the other. In particular, note that the chamber for piston 168 is sealed at the upper end by the outer surface of the piston in contact with the housing wall, and sealed at the lower end by surface 171 in contact with the housing wall. The upper end of the chamber for piston 169 is sealed at the upper end by outer surface of the piston in contact with the housing wall, and sealed at the lower end by surface 172 in contact with the housing. The surfaces at 169 and 171 provide a double seal between the two chambers. It will be understood that appropriate sealing rings may be used where desired.

In operation, if both hydraulic systems are supplied with fluid under pressure from their separate sources as at 55, fluid under pressure in the conduits 153 and 170 acts under the pistons 168 and 169 to compress the Belleville springs 165 and relieve the pressure on the brake discs to free the shaft. If either hydraulic system fails because of lack of fluid pressure as at 55, the other system is effective to release the brake.

Operation of the valve stem 140 in the selector valve 52 is controlled by a rotatable shaft 175 adapted to function similarly in connection with both hydraulic systems. The shaft 175 is mounted for pivotal movement back and forth and has an arm 179 engaging valve stem 140. The shaft is adapted to be pivoted through the medium of an arm 176 fixed on the shaft and recessed as at 177 to receive a driving pin 178 projecting axially from a rotatable disc 180 having a partial internal ring gear 181 integral therewith. The ring gear 181 is part of a differential mechanism including a planet gear 183 on a rotatable carrier 184 adapted to be pivoted by a lever 186 subject to control by the aircraft pilot. The differential mechanism further includes a sun gear 190 rotatable with a worm gear 192. The worm gear is driven by a worm 193 on a shaft 194 having a gear 195 adapted to be driven by a gear 196 on drive shaft 20, 22.

In operation, the above described input and feedback mechanism operates as follows. When the input lever 186 is rotated in a counterclockwise direction, the planet gear 183 rolls on a stationary sun gear 190 to rotate the ring gear 181 in a counterclockwise direction, as a result of which the shaft 175 is pivoted in a clockwise direction, moving the valve stem 140 downwardly to extend the slats 10.

Rotation of the drive shaft 20,22 provides a feedback function to neutralize the selector valve 52, in that the drive shaft gear 196 rotates the shaft 194 in a direction to rotate the worm gear 192 in a counterclockwise direction indicated by the arrow. Sun gear 190 rotates in the same direction, and the carrier 184 is stationary so that planet gear 183 is rotated clockwise, moving the ring gear 181 clockwise to pivot the shaft 175 counterclockwise to elevate valve stem 140 and neutralize the selector valve.

A cam segment 179 is provided, fixed to disc 180, for the purpose of preventing out-of-timed relationship between lever 176 and pin 178 at their extreme limit of travel in either direction. Cam segment 179 has cam surfaces 179a and 179b which engage the left and right sides, respectively, of lever 176 at the extreme positions of the lever. Stops (not shown) are provided in the surrounding housing limiting movement of the lever at the extreme positions thereof. Thus the lever is held between one of cam surfaces 179a and 179b and one of the stops at each of its extreme positions. At the extreme positions, the pin 178 is completely free of lever 176 and in the absence of the cam surfaces 179a and 179b, the lever could rotate away from the stops in the housing.

The feedback system additionally functions effectively to correct any inadvertent movement of the slats due to external forces thereon. That is, if the slats are extended and forces acting thereon tend to retract the slats, and such movement is inadvertently permitted as by brake failure, the movement has the effect of actuating selector valve stem 140 in a direction to again extend the slats.

End-of-travel limit switches may be actuated by the feedback shaft 194 for controlling solenoid valve 50. In particular, shaft 194 has a threaded end portion 196 engaging a switch actuating disc 197 which reciprocates when the shaft rotates. At the lower limit of travel, disc 197 indicates that the slats 10 are at one limit of travel by closing switch 198 to energize solenoid valve 50 and stop motor 40. At the upper limit of travel, disc 197 actuates switch 199 to energize solenoid valve 50 and stop motor 40 when slats 10 reach the opposite limit of travel. It will be understood that the aircraft pilot may subsequently deenergize solenoid valve 50 by manual control (not shown) to reverse the actuator system.

If desired, the hydraulic motors 39 and 40 may drive position indicating means as at 200 for purposes of controlling a remote indicator providing evidence of the position of the slats at any time.

In operation, both an electrical signal and a mechanical signal are required to put the actuator system into operation. Specifically, actuation of solenoid valve 50 under manual control supplies fluid under pressure for actuating free wheeling valve 60, shutoff valve 62, brake valve 64 and the servo assist in selector valve 52. Manual pilot actuation of selector valve 52 permits flow to hydraulic motor 40 and determines the direction of flow. Adjacent the end of travel of the slats, the feedback mechanism limits flow through valve 52 to slow the slat movement just before completion. Eventually the valve 52 is closed by the feedback movement and valve 50 is closed by action of switch 198 or 199. In event of failure of supply pressure for either system, the other is capable of operating the drive shaft while the other motor free wheels. Similarly, either system alone has the capacity to release the brake 42.

I claim:

1. An actuator system, comprising, a rotatable drive shaft, a pair of hydraulic motors, gearing connecting each motor to drive said shaft, separate hydraulic circuits connected respectively for controlling each motor including selectively operable supply valve means controlling fluid supply to the associated motor, a free wheeling valve controlling communication between the motor outlet and the motor inlet, means actuating the free wheeling valve to prevent communication between the motor outlet and the motor inlet responsive to supply of fluid under pressure to the motor on actuation of the supply valve means when fluid under pressure is available in the circuit, and means normally positioning the free wheeling valve to connect the motor outlet and the motor inlet in the absence of fluid under pressure in the circuit, so that the motor may be driven by the shaft and the shaft may be driven by the other motor.

2. An actuator system, comprising, a rotatable drive shaft, a pair of hydraulic motors, gearing connecting each motor to drive said shaft, separate hydraulic circuits adapted to be connected respectively to separate sources of fluid under pressure for controlling each motor separately including conduit means connected with the motor for supplying fluid under pressure from the associated source to drive the motor, selectively operable supply valve means in each conduit means controlling communication between the supply source and the motor, a free wheeling valve controlling communication between the motor outlet and the motor inlet, means actuating the free wheeling valve to prevent communication between the motor outlet and the motor inlet responsive to supply of fluid under pressure to the motor on actuation of the supply valve means when fluid under pressure is available at the supply source, and means normally positioning the free wheeling valve to connect the motor outlet and the motor inlet in the absence of fluid under pressure from the supply source, so that the motor may be driven by the shaft and the shaft may be driven by the other motor.

3. An actuator system, comprising, a drive shaft rotatable in opposite directions, a pair of reversible hydraulic motors, gearing connecting each motor to drive said shaft alone or in combination with the other, separate hydraulic circuits respectively adapted for connection with separate sources of fluid under pressure for separately controlling each motor including supply and return conduits connected with the motor for communication with the associated source of supply for flow of fluid under pressure to drive the motor, selectively operable supply valve means in said conduits controlling communication between the supply and the motor to determine when the motor is driven and the direction in which it is driven, a free wheeling valve controlling communication between the supply and return conduits, means for actuating the free wheeling valve to prevent communication between the supply and return conduits responsive to supply of fluid under pressure to the motor on actuation of the supply valve means when fluid under pressure is available at the supply source, and means for normally positioning the free wheeling valve to connect the supply and return conduits in the absence of pressure at the supply source, whereby the motor may be driven as a pump by the shaft, and the shaft may be driven by the other motor.

4. An actuator system as defined in claim 1, including brake means for controlling the drive shaft, means normally yieldably applying the brake means to hold the shaft against movement, and means responsive to supply of fluid under pressure to either motor on actuation of the supply valve means for releasing the brake means.

5. An actuator system, comprising, a rotatable drive shaft, a pair of hydraulic motors, gearing connecting each motor to drive said shaft, separate hydraulic circuits connected respectively for controlling each motor including selectively operable supply valve means controlling fluid supply to the associated motor, brake means for controlling the drive shaft, means normally yieldably applying the brake means to hold the shaft against movement, and means responsive to supply of fluid under pressure to either motor on actuation of the supply valve means for releasing the brake means.

6. An actuator system as defined in claim 5, wherein the brake means includes brake members and spring means urging the brake members into frictional braking engagement, and the release means comprises a spring seat between the spring means and the brake members, and fluid operable means for retracting the spring out away from the brake members.

7. An actuator system as defined in claim 6, wherein the retracting means comprises a first cup shaped member containing the spring means and providing said spring seat, a second cup shaped member containing the first cup shaped member nested therein, so that retraction of either cup shaped member releases the brake.

8. Actuator system as defined in claim 7, wherein each cup shaped member has an annular outwardly extending flange providing a piston surface engageable by fluid under pressure for retracting the member, and housing means having surfaces in contact with the cup shaped members providing a sealed chamber for each piston surface.

9. An actuator system as defined in claim 8, including means for supplying retracting fluid under pressure to the pistons respectively from the separate hydraulic circuits.

10. An actuator system, comprising, a drive shaft rotatable in opposite directions, a pair of reversible hydraulic motors, gearing connecting each motor to drive said shaft alone or in combination with the other, separate hydraulic circuits respectively adapted for connection with separate sources of fluid under pressure for separately controlling each motor including supply and return conduits connected with the motor for communication with the associated source of supply for flow of fluid under pressure to drive the motor, selectively operable supply valve means in said conduits controlling communication between the supply and the motor to determine when the motor is driven and the direction in which it is driven, a brake housing around the drive shaft, a disc brake in the housing for controlling the drive shaft, spring means normally compressing the brake discs to apply the brake, a first cup shaped container holding the spring means, a second cup shaped container holding the first container nested therein, each container having an enlarged portion functioning as a piston, means on the housing cooperating with the containers providing a sealed chamber for each piston respectively connected to said circuits, a brake valve in each circuit operable responsive to supply of fluid under pressure to the associated motor for supplying fluid under pressure to the associated chamber to release the brake.

11. An actuator system, comprising, a rotatable drive shaft, a brake housing around the drive shaft, a plurality of brake discs rotatable with the shaft, a plurality of alternate brake discs held against rotation in the housing; spring means normally compressing the brake discs, a first cup shaped container holding the spring means, a second cup shaped container holding the first container nested therein, each container having a flange engageable by pressure fluid, means on the housing and the container providing separate fluid chambers for the flanges, and separate circuits for supplying fluid pressure to the fluid chambers so that either container may release the brake.

12. An actuator system, comprising, a rotatable drive shaft, a hydraulic motor connected to rotate the shaft, valve means controlling fluid supply to the motor, a valve actuator for operating the valve means, and mechanism for operating the valve including a first gear connected with the valve actuator, a second gear meshing with the first gear, a carrier supporting the second gear and having a manual control, and a third gear meshing with the second gear and connected for rotation by the drive shaft to provide a feedback signal to return the valve means to neutral when the desired shaft motion is complete.

13. An actuator system, comprising, a rotatable drive shaft, a pair of hydraulic motors, gearing connecting each motor to drive said shaft, separate hydraulic circuits connected respectively for controlling each motor including selectively operable supply valve means controlling fluid supply to the associated motor, a common valve actuator connected for operating the supply valve means in both circuits simultaneously, and a differential mechanism for controlling the valve actuators including a first gear member pivotally connected with the valve actuator for moving the latter back and forth, a second gear member meshing with the first gear member and having a manual control for selectively actuating the valve means, and a third gear member meshing with the second gear member and connected for rotation by said drive shaft to provide feedback motion to return the valve means to neutral when the required shaft motion is complete.

14. An actuator system as defined in claim 13 wherein the valve actuator comprises a pivoted shaft having first and second arms respectively engaging said supply valve means and a third arm engaging said first gear member.

15. An actuator system as defined in claim 13 wherein said first gear member comprises a ring gear having an arm engaging said valve actuator, said second gear member comprises a planet gear having a pivotal carrier with an arm adapted to be manually manipulated to selectively operate the valve means, and said third gear member comprises a sun gear rotatable in timed relation with the drive shaft.

16. An actuator system as defined in claim 14, wherein the first gear member includes an arm having an eccentric pin engaging a slot in said third actuator arm.

17. An actuator system as defined in claim 13 including electrically operable valve means in said circuits controlling motor operation, switch means controlling the electrically operable valve, and means responsive to shaft rotation for operating the switch means to actuate the electrically operable valve means to stop the motors when desired shaft motion is complete.

* * * * *